Figure 1:
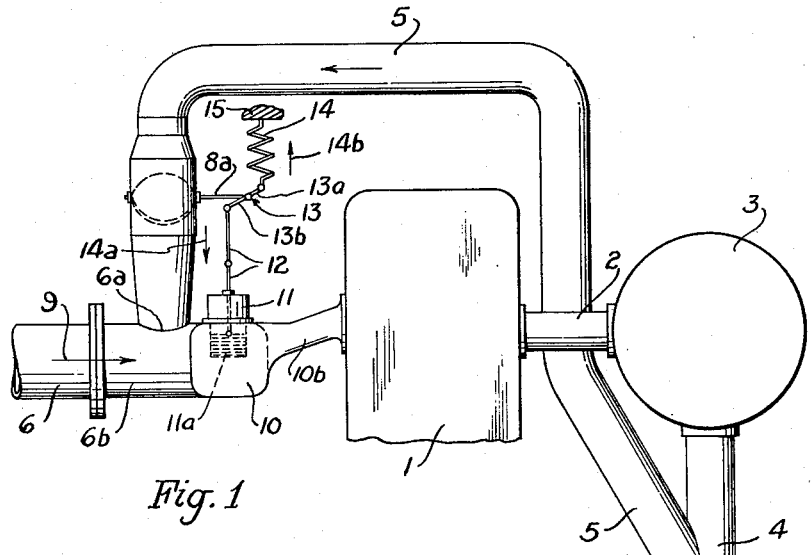

June 2, 1964     E. MÜHLBERG     3,135,253

RECYCLED EXHAUST GAS REGULATION

Filed Nov. 15, 1961

INVENTOR

*Erhard Mühlberg*

BY *Bailey, Stephens & Huettig*

ATTORNEYS

United States Patent Office 3,135,253
Patented June 2, 1964

3,135,253
RECYCLED EXHAUST GAS REGULATION
Erhard Mühlberg, Nurnberg, Germany, assignor to Maschinenfabrik Augsburg-Nurnberg A.G., Nurnberg, Germany
Filed Nov. 15, 1961, Ser. No. 152,422
Claims priority, application Germany Dec. 24, 1960
5 Claims. (Cl. 123—119)

This invention relates to the recycling of the exhaust gases in an internal combustion engine and, in particular, is directed to the controlled partial recycling of the exhaust gases in a diesel engine.

It has been heretofore accepted that in the recycling of exhaust gases from the exhaust pipe to the air intake pipe, the regulating member for the return of the exhaust gases as, for example, a throttle valve must be opened to increase the amount of recycled exhaust gases as the temperature of the engine decreases. In one system working according to this principle, a temperature sensing device is positioned in the exhaust gas pipe so that it is indirectly contacted by the hot exhaust gases coming from the engine. Thus this sensing device is responsive to the temperature of the exhaust gases which are proportional to the temperature of the engine and actuates a regulating member such as a throttle valve so as to regulate automatically the exhaust gases which are to be recycled.

However, it is not altogether desirable to subject the temperature sensing device directly to the very hot exhaust gases because of the danger of damaging the sensing device by corrosion and deterioration, which is due to the chemicaly aggressive component parts of the exhaust gases, as such damage will considerably impair the function of the sensing device and therewith the operation of the complete regulating system. In such case, the amount of exhaust gases recycled is irregular and does not correspond to the optimum utilization of fuel and pressures which should be provided the engine. Furthermore, in such arrangement, the thermal shocks on the sensing device which are inevitable because of the abrupt changes in the temperatures of the exhaust gases adversely affect the life of the sensing device. Finally, there is another disadvantage that has to be considered for the entire regulating system. This is because the temperature error introduced into the sensing device because of the soot in the exhaust gases and deposited on the sensing device must be compensated for by special means displaced from the exhaust pipe before the throttle valve can be actuated for recycling the exhaust gas to the air intake pipe.

This invention teaches how the aforementioned disadvantages are avoided. According to this invention, a temperature of a mixture of fresh intake air and hot recycled exhaust gas is measured, which temperature is substantially lower than the temperature of the exhaust gases alone. This lower temperature serves as the value for regulating the recycling of the exhaust gases.

By this means, the sensing device is installed in a gaseous medium in which practically no damage can occur to it. Another advantage is in that, when hydrocarbon fuels forming sooty exhaust gases are used, the possibility of the sensing device becoming sooty is substantially reduced as compared to a sensing device exposed directly to the hot exhaust gases because of the dilution of the exhaust gases with the fresh intake air. Again this repositioning of the sensing device still achieves a high quality of regulation despite the low construction expense required. This latter is especially important for engines in vehicles having inherent operating conditions such as a complete range of loads and engine speeds which are intermittent, such as during acceleration and deceleration. It has been found that the accuracy in regulating the recycling of the exhaust gases becomes of decisive importance when using fuels which are extremely difficult to ignite and which therefor have not been in everyday use in diesel engines. These fuels are crude alcohols, such as methyl and ethyl alcohols, as well as liquid hydrocarbons having an extremely high content of additives as, for example, gasoline-benzine mixtures and/or anti-knock additives.

Figure 2:
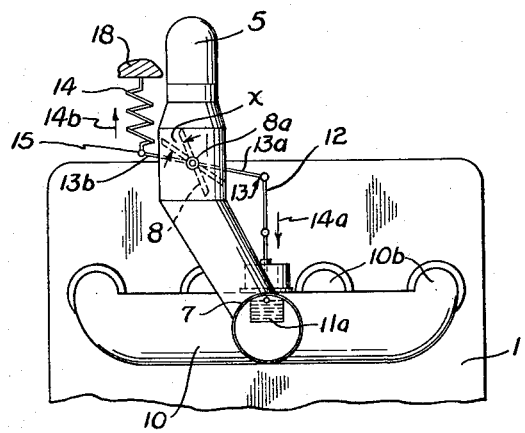

The means by which the objects of this invention are obtained are disclosed more fully with reference to the accompanying diagrammatic drawings, in which:

FIGURE 1 is a front elevational view of the regulating system in this invention; and FIGURE 2 is a side view of FIGURE 1.

The self-ignition internal combustion engine 1 has an exhaust manifold 2 which directs the exhaust gases into a muffler 3. The gases are discharged from muffler 3 through exhaust pipe 4 into the atmosphere. A gas recycling pipe 5 extends between exhaust pipe 4 and is connected to the fresh air intake pipe 6 at the joint 6a in a fitting 6b. Immediately in front of joint 6a is a throttle valve 8 in pipe 5 for controlling the amount of exhaust gas recycled to the air intake pipe 6. As viewed in the direction of the intake air arrow 9, between the joint 6a and the engine 1 is the air intake manifold 10 connected to the engine by pipes 10b and in manifold 10 is mounted a temperature sensing device 11 for the regulating system, which device also actuates valve 8 for controlling the recycling of the exhaust gases. Sensing device 11 is of the simplest form, such as one having a fluid-filled bellows 11a.

As shown more clearly in FIGURE 2, bellows 11a is joined by rod 12 to two-arm lever 13. At the end of the right arm 13a, lever 13 is fastened to the shaft 8a of valve 8 for turning the valve. At the end of the left arm 13b of lever 13 is connected the valve return spring 14. It is noted that in FIGURE 2 the lever arm 13a is exaggerated with respect to FIGURE 1 for purposes of clarity. Spring 14 to a great degree suppresses undesired fluctuations of the regulating system. This is because bellows 11a produces a downward force 14a which is opposed by the spring force 14b which urges bellows 11a to its starting position and thus causes the bellows to work against the returning force 14b.

The regulating system as shown operates as follows:

When the engine temperature falls because of a decreased load and/or a decreased engine speed, and/or a falling atmospheric temperature, then the temperature of the exhaust gas correspondingly falls. This results in that, first, the temperature of the mixture composed of fresh intake air and hot recycled exhaust gases flowing through manifold 10 falls below the minimum temperature for which the thermostat is set. Therefore, bellows 11a contracts and gives a regulating movement directly to valve 8 in the sense that more exhaust gases are recycled. That is to say, that the contraction of the bellows moves rod 12 and lever 13 to open valve 8. This regulating system operates in a reverse manner when the operating conditions change so that the engine runs hotter.

The advantages of this regulating system, and especially the extremely sensitive regulation, are due to the fact that the bellows 11a of sensing device 11, which serves both as a temperature senser and a valve actuator, is contacted directly by a rapidly flowing gas. This results in a good heat transfer to bellows 11a and renders the bellows sufficiently sensitive so that it acts so quickly that even when using a fuel difficult to ignite, such as methyl or ethyl alcohols, a diesel engine shows a satisfactory acceleration even when substantially cooled by a prolonged idling of more than an hour. Because the corrugated bellows has a large heat exchange surface area, the conventional fluid-filled bellows thermostat disclosed produces the advantages of this invention in spite of its conventional use for thermostatically controlling the cooling water flow in the cooling system of an engine.

For similar reasons, the conventional bi-metallic body has been found satisfactory as a sensing device to transmit movement to the valve, with the temperature sensitive portion being composed of a plurality of stacked bi-metallic discs.

Also, the so-called wax thermostats have been found satisfactory for use as sensing devices and movement producing devices. Such thermostats have been used for regulating the flow of cooling water in the cooling system of an engine. For the purposes of this invention, their heat transfer surface area is increased by the addition of fins.

The regulation of the recycled exhaust gases when using the bellows 11a functions so that only the optimum amount of exhaust gas is recycled into the air intake pipe in order to obtain the minimum required temperature for the mixture of fresh air and hot exhaust gas. Accordingly, the capacity range of the bellows includes this minimum temperature and the higher temperature in which the bellows is fully responsive.

The minimum temperature point for the bellows 11a depends upon the inability of the fuel to ignite below that temperature and also upon the object to be achieved by recycling the exhaust gas. This minimum temperature has to be determined by tests in each case. In general, it can be said that the minimum temperature for the bellows must be chosen higher the more incapable of ignition the fuel is.

It has been found that it is of advantage, and in some cases even of decisive importance, that the sensitivity and speed of operation of the regulating system is kept as high as possible when the return force 14b of spring 14 is as low as possible with respect to the opening of valve 8. Otherwise the mixture of fresh intake air and recycled exhaust gas will become colder due to the time lag of bellows 11a, and this temperature will continue to fall at a time when it is most undesirable, as during the heat decreasing temperature of the engine.

To avoid this disadvantage, which leads not only to a waste of fuel because of insufficient combustion of the fuels, especially with fuels extremely difficult to ignite, but it also could interfere with the engine operation because of the interruption of the ignition in the individual engine cylinders, or even a complete failure to ignite, this invention incorporates the following features:

The length of lever arm 13b attached to spring 14 is kept as short as possible so that when the valve 8 is turned, the connection point 15 between spring 14 and arm 13b is only slightly displaced with respect to the fixed point 18 for spring 14. By so doing, the length of the spring and the force 14b is changed but little.

Return spring 14 should be as soft as possible in order to avoid changes in the length of the spring and to obtain only small changes in the spring force 14b during the turning of valve 8.

Both these measures of having a short lever arm and a soft spring have the effect that the bellows force 14a becomes as independent as possible of the angle $x$ of valve 8 and as heretofore indicated, the force 14a acting on the bellows 11a in the sense of contracting it is not undesirably decreased with a decreasing temperature of the engine.

Having now described the means by which the objects of the invention are obtained,

I claim:

1. In an internal combustion diesel engine having a combustion air intake pipe and an exhaust gas pipe, and means for recycling at least a portion of the hot exhaust gas to the air intake pipe for mixing with and heating the intake air, the improvement comprising temperature sensitive means responsive to the temperature of the mixed intake air and exhaust gas for increasing the quantity of exhaust gas recycled to the air intake pipe as the engine operating conditions decrease in temperature, and vice versa.

2. In an engine as in claim 1, said temperature sensitive means comprising a thermostat having a large heat responsive surface area exposed to the mixture of intake air and exhaust gas for regulating the quantity of exhaust gas mixed with intake air so that the temperature of the mixed air and exhaust gas stays substantially constant at a minimum engine operating temperature over the range of the capacity of said thermostat.

3. In an engine as in claim 2, said temperature sensitive means further comprising an exhaust gas return pipe extending between said exhaust pipe and said air intake pipe, a butterfly throttle valve mounted in said return pipe, and levers linking said valve to said thermostat.

4. In an engine as in claim 3, further comprising force producing means secured to said valve for urging said valve toward the initial thermostat set position and for dampening fluctuations of said valve as created by movements of said thermostat.

5. In an engine as in claim 4, said force producing means comprising a soft spring connected by small leverage with said valve for keeping the spring force as constant as possible over the capacity range of said thermostat in regulating the quantity of exhaust gas mixed with intake air.

References Cited in the file of this patent
UNITED STATES PATENTS

| 1,916,325 | McAdams | July 4, 1933 |
| 2,645,216 | Campbell | July 14, 1953 |
| 2,742,885 | Thwaites et al. | Apr. 24, 1956 |